United States Patent
Jayasuriya et al.

(10) Patent No.: US 9,216,675 B2
(45) Date of Patent: Dec. 22, 2015

(54) VERTICALLY ADJUSTABLE ERGONOMIC ARMREST FOR AUTOMOBILE

(71) Applicant: Ford Global Technologies, LLC, Dearborn, MI (US)

(72) Inventors: Mangala A. Jayasuriya, Bloomfield Hills, MI (US); Robert William McCoy, Ann Arbor, MI (US); Carrie Ann Bittick, Rochester Hills, MI (US); Krishnakanth E. Aekbote, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/253,083

(22) Filed: Apr. 15, 2014

(65) Prior Publication Data

US 2015/0291069 A1 Oct. 15, 2015

(51) Int. Cl.
*B60N 2/46* (2006.01)
*B60R 13/02* (2006.01)

(52) U.S. Cl.
CPC ............ *B60N 2/466* (2013.01); *B60R 13/0243* (2013.01)

(58) Field of Classification Search
CPC ...... B60N 2/464; B60N 2/466; B60N 2/4666; B60N 2/4626; B60N 2/4633; B60N 2/4646; B60N 2/4656; B60N 2/4606; B60N 3/023; B60N 3/0236
USPC ................................................. 296/1.09, 153
See application file for complete search history.

(56) References Cited

U.S. PATENT DOCUMENTS

| | | | |
|---|---|---|---|
| 2,325,292 A | | 7/1943 | Westrope |
| 3,603,637 A | * | 9/1971 | DePinto ......................... 296/153 |
| 4,521,056 A | * | 6/1985 | Lindenmuth ............ 297/411.21 |
| 4,659,135 A | * | 4/1987 | Johnson ........................ 296/153 |
| 4,702,520 A | | 10/1987 | Whisler et al. |
| 5,816,645 A | * | 10/1998 | Grimes ........................ 296/153 |
| 5,967,594 A | | 10/1999 | Ramanujam |
| 6,767,065 B2 | | 7/2004 | Heranney |
| 7,484,809 B2 | | 2/2009 | Hughes |
| 7,537,268 B2 | * | 5/2009 | Becker et al. .................. 296/153 |
| 7,753,424 B2 | | 7/2010 | Sommer et al. |
| 2004/0075297 A1 | * | 4/2004 | Bornchen et al. ............. 296/153 |
| 2005/0134085 A1 | * | 6/2005 | Gramss ......................... 296/153 |
| 2006/0163933 A1 | * | 7/2006 | Radu et al. ............... 297/411.35 |

FOREIGN PATENT DOCUMENTS

| | | |
|---|---|---|
| DE | 10144485 | 3/2003 |
| DE | 102006053329 | 5/2007 |
| EP | 1676743 | 7/2006 |
| EP | 1676744 | 7/2006 |

* cited by examiner

*Primary Examiner* — Gregory Blankenship
(74) *Attorney, Agent, or Firm* — Vichit Chea; Price Heneveld LLP

(57) ABSTRACT

A vehicle armrest assembly includes a vertically operable armrest. A door frame is coupled to the armrest and the armrest assembly includes an adjustment mechanism that selectively positions the armrest between a plurality of vertical positions relative to the door frame. A control is in communication with the adjustment mechanism. An interior door trim is configured to slidably engage a recess defined in the armrest. The recess positions the door trim distal from a substrate of the armrest.

18 Claims, 7 Drawing Sheets

VERTICALLY ADJUSTABLE ERGONOMIC ARMREST FOR AUTOMOBILE

FIELD OF THE INVENTION

The present invention generally relates to vehicle armrests, and more specifically, a vehicle armrest having a vertically operable portion for ergonomically providing for the comfort of occupants of varying sizes.

BACKGROUND OF THE INVENTION

Vehicles contain various styles of armrests within door assemblies and also within side panels adjacent to vehicle seating, where no door is present. Various armrests can include vertically operable portions where the structure of the armrest is tied to various structural members of the vehicle door or of vehicle framing members. Such vertically operable armrests can provide for the comfort of occupants of varying sizes and shapes.

SUMMARY OF THE INVENTION

According to one aspect of the present invention, a vehicle armrest assembly includes a vertically operable armrest. A door frame is coupled to the armrest and the armrest assembly includes an adjustment mechanism that selectively positions the armrest between a plurality of vertical positions relative to the door frame. A control is in communication with the adjustment mechanism. An interior door trim is configured to slidably engage a recess defined in the armrest. The recess positions the door trim distal from a substrate of the armrest.

According to another aspect of the present invention, a vehicle armrest includes a door frame, a door trim and an armrest vertically operable relative to the door frame and door trim between a plurality of positions. The armrest includes a recess for receiving a portion of the door trim in each of the plurality of positions. The recess maintains the door trim distal from a substrate of the armrest.

According to another aspect of the present invention, a vertically operable armrest for a vehicle door includes a vertically operable cushion having a substrate and a recess defined within the cushion. A door frame is coupled to the substrate. An adjustment mechanism of the vertically operable armrest includes a substrate portion and a frame portion. The adjustment mechanism selectively positions the substrate between a plurality of vertical positions relative to the door frame. A control is in communication with at least one of the substrate portion and the frame portion of the adjustment mechanism. An interior door trim is configured to slidably engage the recess in each of the plurality of positions of the substrate. The recess positions the door trim distal from the substrate.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
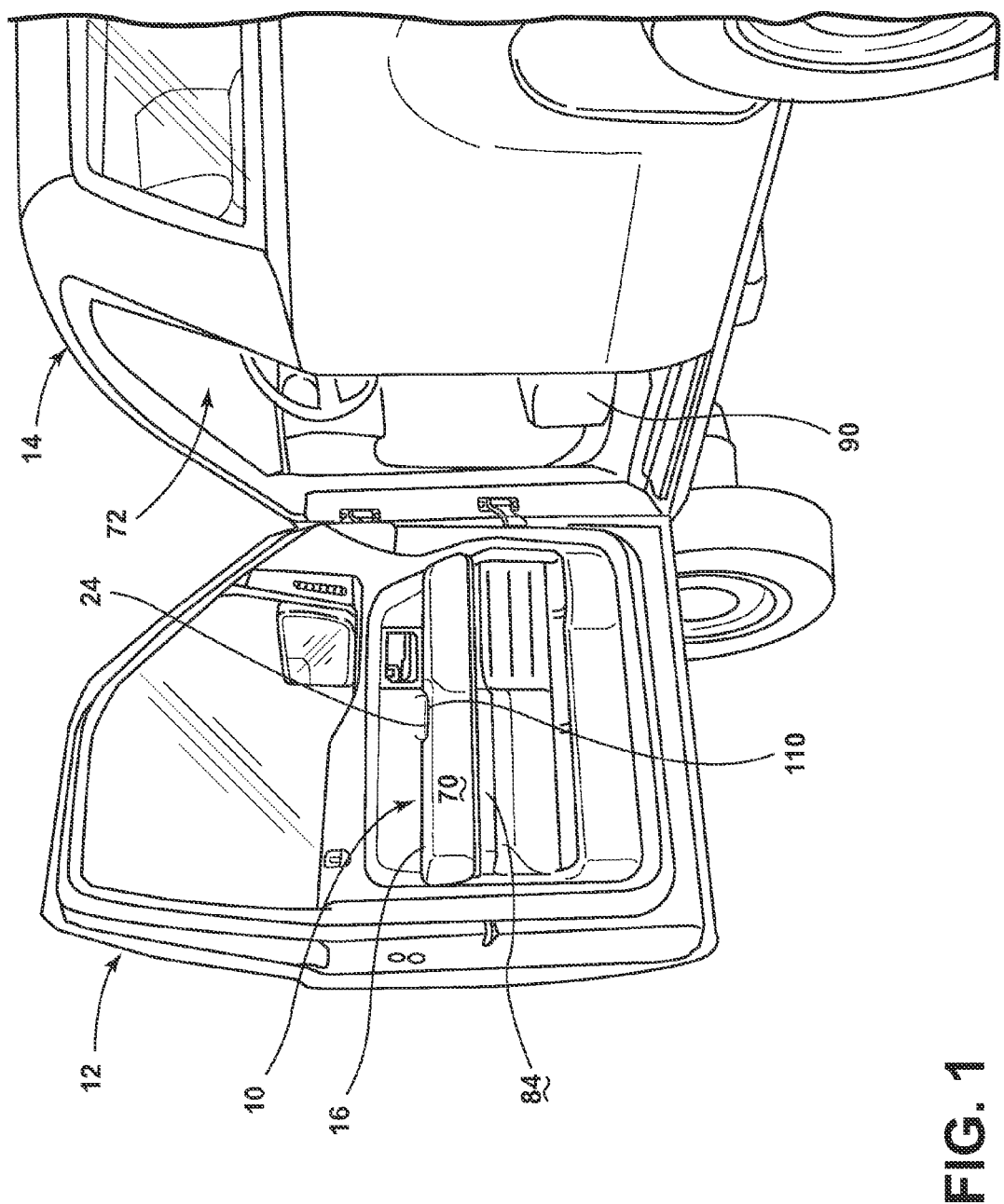
FIG. 1 is a rear side perspective view of a vehicle with a door in the open position and an embodiment of the vertically operable armrest installed.
Figure 2:
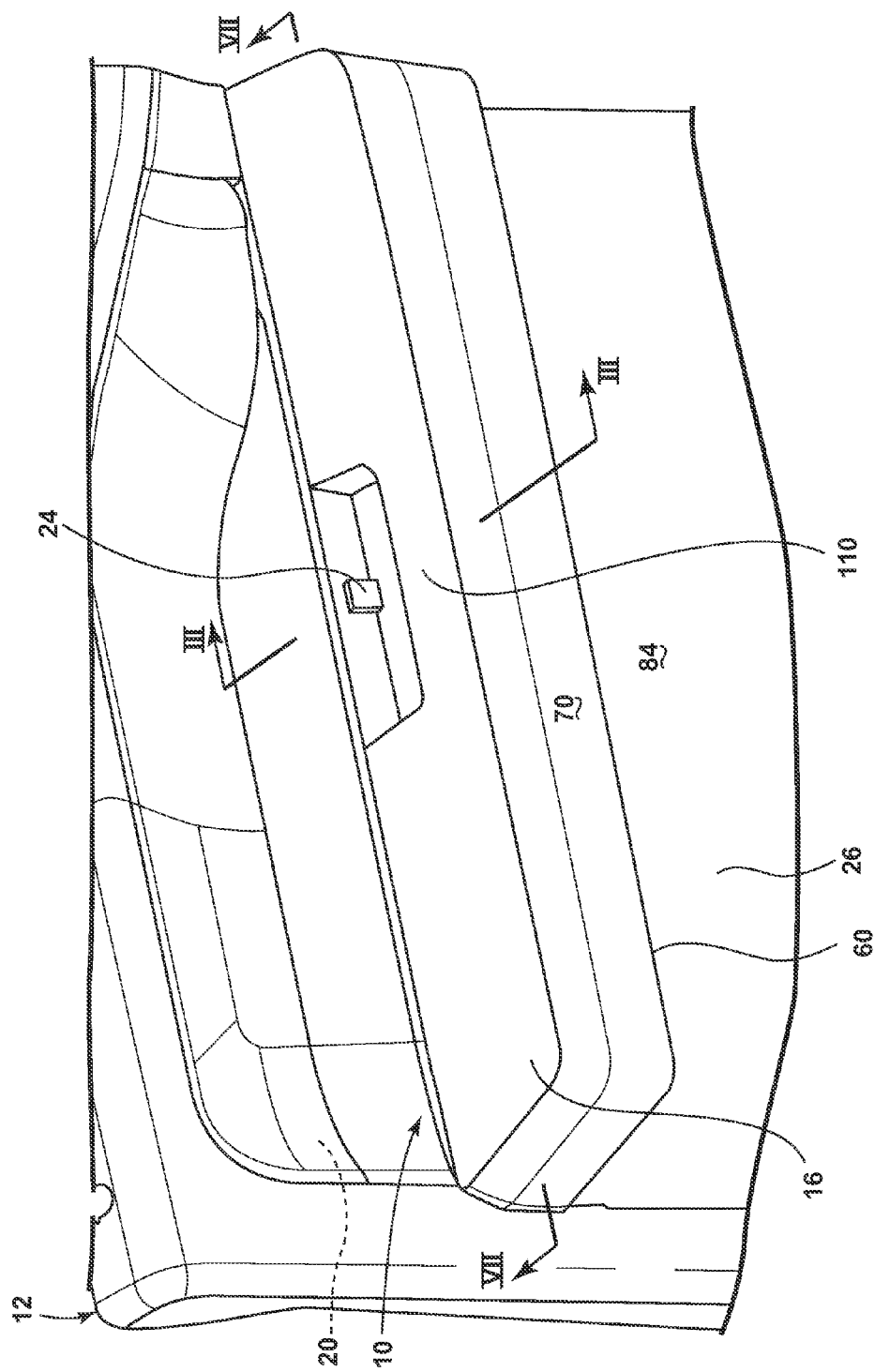
FIG. 2 is a top perspective view of one embodiment of the vertically operable armrest of FIG. 1.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-4, reference numeral 10 generally refers to a vehicle armrest assembly 10 for a vehicle door 12 of a vehicle 14 that includes a vertically operable armrest 16. A door frame 20 of the vehicle door 12 is coupled to the armrest 16 and an adjustment mechanism 22 is included that selectively positions the armrest 16 between a plurality of vertical positions relative to the door frame 20. A control 24 is in communication with the adjustment mechanism 22 for operating the substrate 18 between the plurality of vertical positions. An interior door trim 26 of a vehicle door 12 is configured to slidably engage a recess 28 defined within the armrest 16, wherein the recess 28 positions the door trim 26 distal from a substrate 18 of the armrest 16. In the various embodiments, portions of the door trim 26 can be reinforced, such as at an upper portion 60 of the door trim 26. Such reinforcement can be accomplished by any one of several methods that include, but are not limited by, folding over an edge of the door trim 26, thickening a portion of the door trim 26, adding a reinforcing member to the door trim 26, among others. It is contemplated that the reinforcement that may be applied to the door trim 26 can be positioned within the recess 28 of the arm rest 16. In such an embodiment, the reinforcement can be concealed within the recess 28.

Referring again to FIGS. 3 and 4, the adjustment mechanism 22 of the armrest 16 includes a frame portion 40 that selectively engages a portion of the door frame 20. A substrate portion 42 couples with at least a portion of the substrate 18 of the armrest 16 and can be selectively moved between the plurality of vertical positions with respect to the frame portion 40. The frame portion 40 and substrate portions 42 of the adjustment mechanism 22 cooperate to adjustably secure the vehicle armrest 16 between the plurality of vertical positions, including an upper position 44 and a lower position 46. It is contemplated that the control 24 is in communication with at least one of the substrate portion 42 and the frame portion 40. It is further contemplated that the substrate portion 42 can include a release mechanism to selectively disengage the armrest 16 from the frame portion 40 of the door frame 20 to allow for the substantially free movement of the vertically operable vehicle armrest 16 between the plurality of vertical positions. It is further contemplated that the control 24 can be in communication with the release mechanism. In this manner, the user of the vehicle 14, whether the driver or a passenger, can utilize the control 24 of the vertically operable vehicle armrest 16 to activate the adjustment mechanism 22 that selectively disengages the substrate portion 42 of the adjustment mechanism 22 from the frame portion 40 proximate the door frame 20 to allow the user to vertically operate the vehicle armrest 16 between the plurality of vertical positions.

In various alternate embodiments, it is contemplated that the adjustment mechanism 22 can be configured such that the control 24 selectively disengages the substrate portion 42 of the adjustment mechanism 22 from the frame portion 40 to allow the user to vertically operate the vehicle armrest 16 between the plurality of vertical positions. In such an embodiment, the frame portion 40 of the adjustment mechanism 22 is engaged with the door frame 20.

Referring again to FIGS. 3 and 4, the recess 28 defined within the armrest 16 includes a substantially linear slot that is configured to receive at least a portion of the door trim 26 as the vertically operable armrest 16 is moved upward and downward between the plurality of vertical positions. As the armrest 16 is moved to the lower position 46, an upper portion 60 of the interior door trim 26 extends into and is at least partially concealed within the recess 28 defined within the armrest 16 of the vehicle armrest assembly 10. Conversely, as the vertically operable armrest 16 is moved to the upper position 44, the armrest 16 is repositioned such that the recess 28 defined within the armrest 16 slides away from the upper portion 60 of the door trim 26. It is contemplated that the door trim 26 is a substantially fixed member of the vehicle door 12 and can be coupled to a portion of the door frame 20 below the vertically operable vehicle armrest 16. In this manner, a lower portion of the door trim 26 is coupled to the door frame 20 while the upper portion 60 of the door trim 26 extends into at least a portion of the recess 28 defined within the armrest 16 of the vertically operable vehicle armrest assembly 10. It is contemplated that the armrest 16 can include a cushion wherein the recess 28 is defined within the cushion.

Figure 3:
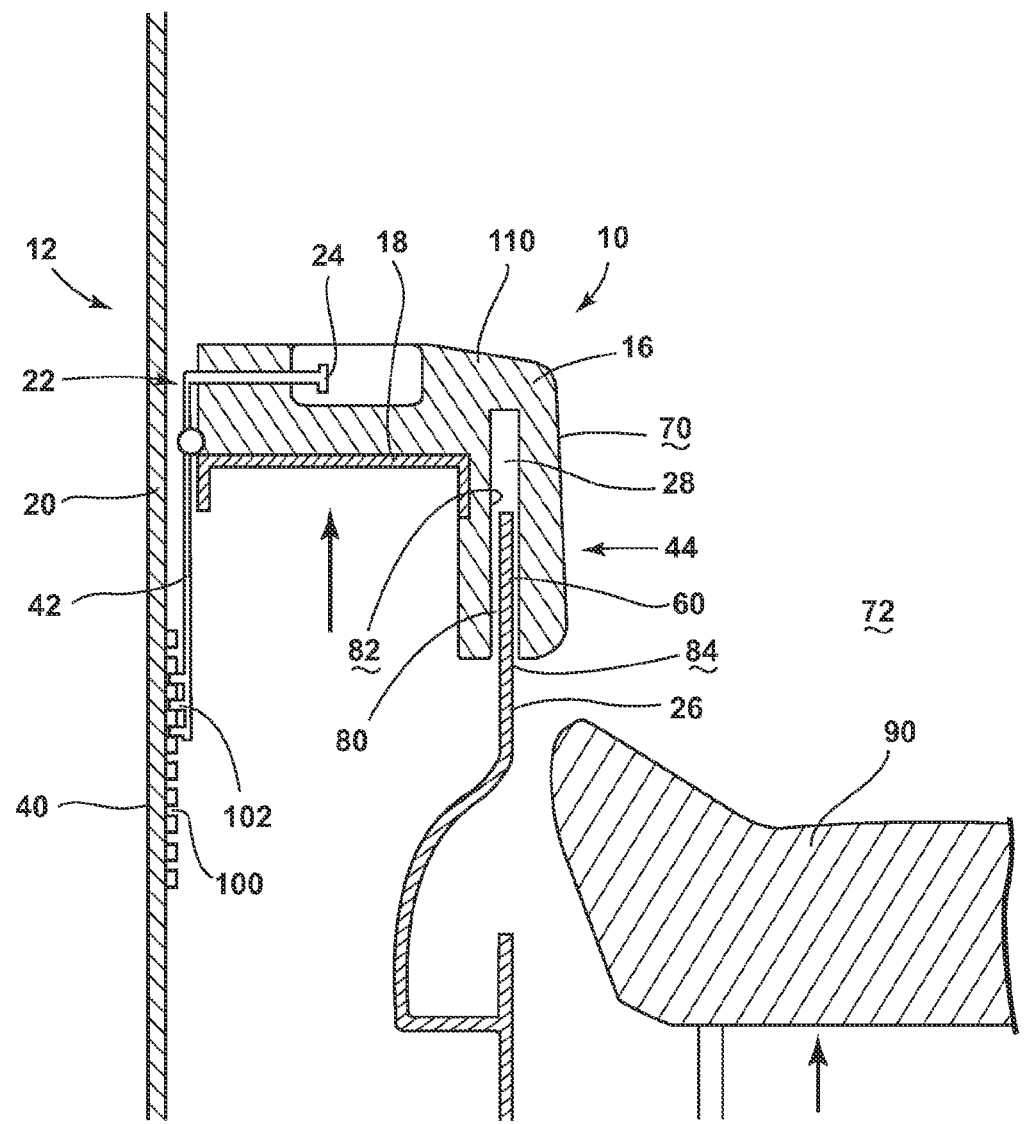
FIG. 3 is a cross-sectional view of the vertically operable armrest of FIG. 2 taken at line III-III, and with the vertically operable armrest in an upper position.
Figure 4:
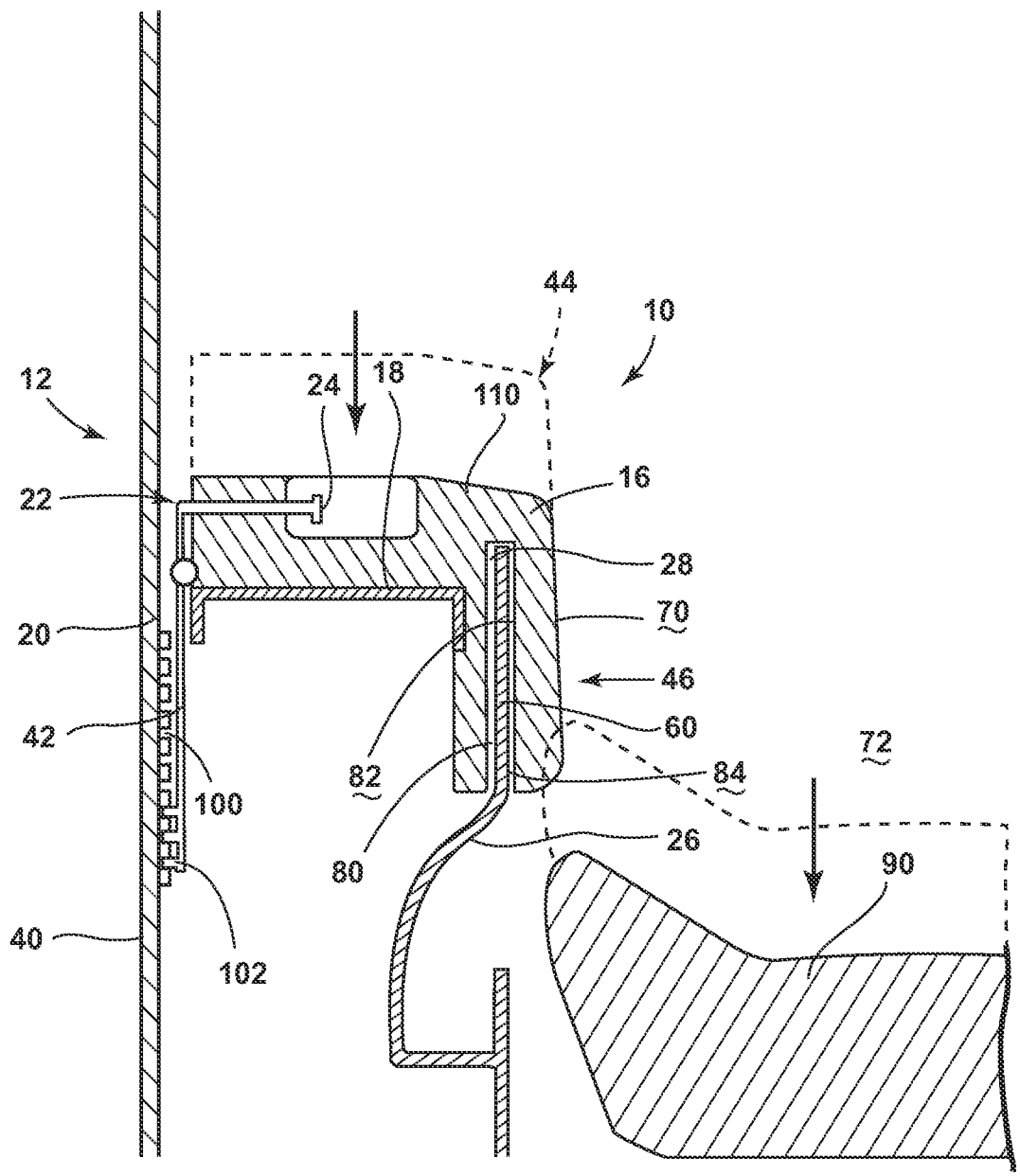
FIG. 4 is a cross-sectional view of the vertically operable armrest of FIG. 3 with the vertically operable armrest in a lower position.

As illustrated in FIGS. 3 and 4, the recess 28 defined within the armrest 16 is positioned between an outer surface 70 of the armrest 16 that extends into the passenger cabin 72 of the vehicle 14 and the substrate 18 of the armrest 16. In this manner, the upper portion 60 of the door trim 26 disposed within the recess 28 remains separate from the substrate 18 of the armrest 16. This configuration eliminates the need for a rigid connection between the substrate 18 of the armrest 16 and the door trim 26. By way of explanation, and not limitation, a lateral load may be placed upon the armrest 16, such as in a side impact condition where the armrest 16 may be pushed inward into the passenger compartment and, potentially, against the user of the vehicle 14. In such conditions, according to the various embodiments, the lack of a rigid connection between the door trim 26 and the substrate 18 can provide an additional cushioning functionality for absorbing energy. This cushioning between the door trim 26 and the substrate 18 allows the door trim 26 to deflect a greater distance than if the door trim 26 was rigidly connected to the substrate 18.

In the various embodiments, the armrest 16 of the vehicle armrest assembly 10 can include a substantially elastic material such as foam, elastic polymers, and various other cushion-type materials. In this manner, as a lateral force is applied to the outer surface 70 of the armrest 16, the armrest 16 deflects in an inward direction and also allows the upper portion 60 of the door trim 26 to similarly deflect away from the passenger compartment, thereby minimizing the force exerted against a passenger or driver of the vehicle 14 proximate the vehicle armrest 16. In addition to the armrest 16 of the vehicle armrest assembly 10, the recess 28 disposed within the armrest 16 can be configured to be wider than the thickness of the door trim 26. In such an embodiment, the upper portion 60 of the door trim 26 can be allowed a predetermined amount of deflection within the recess 28 without deforming a portion of the armrest 16 proximate the recess 28. This deflection space 80 within the recess 28 between the inner surface 82 of the armrest 16 and the exterior surface 84 of the door trim 26 can be adapted to further minimize the force exerted against the passenger or driver of the vehicle 14 proximate the vertically operable vehicle armrest assembly 10 by allowing the door trim 26 to deflect substantially freely within the recess 28.

Referring again to FIGS. 3 and 4, the control 24 of the vehicle armrest assembly 10 and the adjustment mechanism 22 can be configured such that the vertically operable vehicle armrest 16 moves between a plurality of vertical positions along with the vertical movements of the vehicle seat 90 adjacent to the vehicle armrest assembly 10. In this manner, the outer surface 70 of the armrest 16 can be substantially maintained at a predetermined height relative to the adjacent vehicle seat 90. This relative vertical operation between the armrest 16 and the vehicle seat 90 can add to the comfort of the passenger or driver and also add to the safety of the passenger or driver by properly aligning the armrest 16 relative to the height of the passenger or driver within the vehicle seat 90 adjacent to the vehicle armrest assembly 10. It is further contemplated that the armrest 16 can be independently operable between the plurality of vertical positions relative to the vehicle seat 90. In this manner, fine adjustments can be made to maximize the comfort and/or safety of the vehicle armrest 16. Additionally, large vertical movements of the vertically operable armrest 16 are also capable where desired by the passenger or driver using the armrest 16.

Referring again to FIGS. 3 and 4, it is contemplated that the frame portion 40 of the adjustment mechanism 22 can include a plurality of slots 100 and the substrate portion 42 of the adjustment mechanism 22 can include a corresponding plurality of teeth 102 that are adapted to engage the plurality of slots 100. In this manner, the plurality of teeth 102 of the substrate portion 42 can vertically align with and engage a portion of the plurality of slots 100 of the frame portion 40 of the adjustment mechanism 22 to selectively secure the vertically operable armrest 16 in one of the plurality of vertical positions. To reposition the vertically operable armrest 16 to another vertical position, such as the upper or lower position 44, 46, the operator can utilize the control 24 to disengage the teeth 102 of the substrate portion 42 from the slots 100 of the frame portion 40 so that the vertically operable armrest 16 can be repositioned to one of the other vertical positions.

In various alternate embodiments, the substrate and frame portions 42, 40 of the adjustment mechanism 22 can include other selective engagement mechanisms. Such mechanisms can include, but are not limited to, cooperative protrusions, cooperative protrusions and recesses, detent/indent mechanisms, cooperative tabs, friction securing mechanisms, pins, slots, as well as other cooperative securing mechanisms. It is contemplated that the securing mechanism used in the vehicle armrest assembly 10 can be in communication with the control 24. In this manner, the control 24 can be configured to selectively release and engage the securing mechanism to allow the vehicle armrest assembly 10 to be operated between the plurality of vertical positions.

In the various embodiments, the vehicle armrest assembly 10 can include an upward biasing mechanism or counterbalancing system that assists the user in moving the vertically operable armrest 16 in an upward direction while also preventing the armrest 16 from falling to the lower position 46 when the adjustment mechanism 22 is disengaged. The biasing mechanism or counterbalancing system can include various mechanisms that include, but are not limited to, springs, pneumatic mechanisms, hydraulic mechanisms, counterweights, and other similar biasing or counterbalancing mechanisms.

Referring again to FIGS. 2-4, it is contemplated that the vehicle armrest assembly 10 can include a handle 110 that can be configured to assist the user in vertically and manually operating the armrest 16. Within this handle 110, the control 24 can be disposed such that the control 24 is conveniently accessible to the user when the user desires to vertically operate the armrest 16 to any one of the vertical positions. It is contemplated that the handle 110 and the control 24 can be positioned on various portions of the armrest 16, including, but not limited to, an end, a central portion, a side, or other portion of the armrest 16. It is further contemplated that the control 24 can be positioned adjacent to the armrest 16 in various embodiments. In the various embodiments, the control 24 can include various user interfaces that can include, but are not limited to, levers, buttons, switches, tabs, push or pull devices, as well as other various user interface mechanisms.

In the various embodiments, it is contemplated that the control 24 can manually operate the adjustment mechanism 22 of the vehicle armrest assembly 10 to manually engage and disengage the substrate portion 42 of the adjustment mechanism 22 from the frame portion 40 of the adjustment mechanism 22. It is further contemplated that the adjustment mechanism 22 can include a biasing feature that biases the substrate portion 42 into engagement with the frame portion 40 of the adjustment mechanism 22. In this manner, the biasing feature can substantially prevent unwanted release or repositioning of the vertically operable armrest 16 during use. Additionally, in various embodiments, the control 24 and adjustment mechanism 22 can include a locking feature that substantially secures the substrate portion 42 of the adjustment mechanism 22 with the frame portion 40 of the adjustment mechanism 22 to further prevent unwanted release or repositioning of the armrest 16. In such an embodiment, the control 24 can be configured to operate the locking feature.

Figure 5:
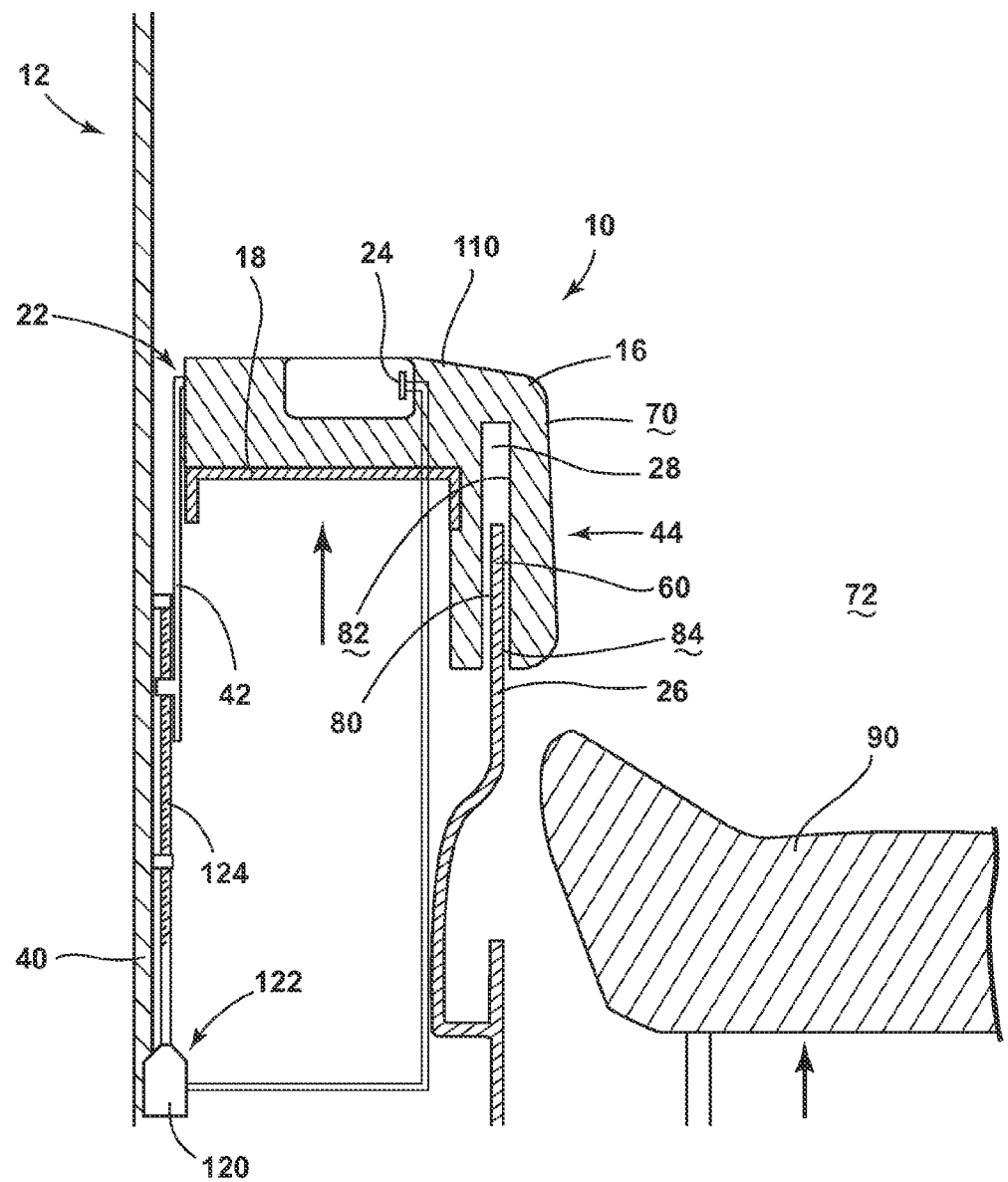
FIG. 5 is a cross-sectional view of an alternate embodiment of the vertically operable armrest with the vertically operable armrest in the upper position.
Figure 6:
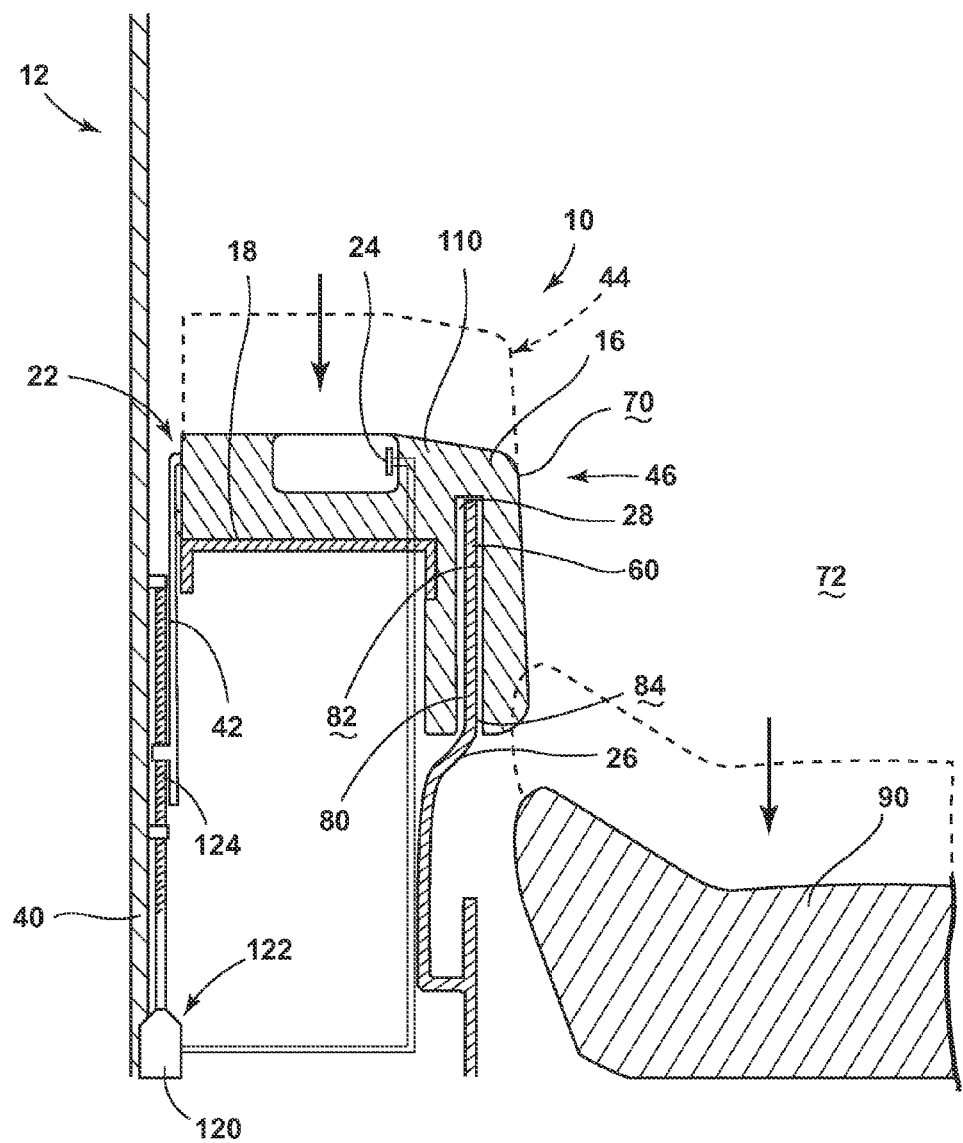
FIG. 6 is a cross-sectional view of the vertically operable armrest of FIG. 5 with the vertically operable armrest in the lowered position.

Referring now to FIGS. 5 and 6, the vehicle armrest assembly 10 can include a motor 120 in communication with at least one of the substrate portion 42 and the frame portion 40 of the adjustment mechanism 22. In such an embodiment, the motor 120 is configured to operate at least one of the substrate portion 42 and the frame portion 40 to vertically position the armrest 16 in any one of a plurality of positions between and including the upper and lower positions 44, 46. It is contemplated that the control 24 may be in communication with the motor 120 such that the user can operate the control 24 to engage and disengage the motor 120 to vertically operate the armrest 16 between the plurality of positions.

Referring again to FIGS. 5 and 6, it is contemplated that the motor 120 can be connected to one of several operating mechanisms to vertically operate the armrest 16 between the plurality of vertical positions. Such operating mechanisms can include, but are not limited to, screw-type drive system 122, pulley systems, levers, scissor-type lifting mechanisms, pneumatic systems, hydraulic systems, geared mechanisms, and other similar mechanical lifting mechanisms. By way of explanation, and not limitation, FIGS. 5 and 6 include a screw-type drive system 122 in communication with the motor 120 to position the armrest 16 in any one of the plurality of vertical positions. In such an embodiment, when the motor 120 is engaged, the motor 120 drives a screw 124, either clockwise or counterclockwise, wherein the screw-type drive system 122 serves to raise or lower the vertically operable armrest 16 between the plurality of positions. Generally, in such an embodiment, the substrate portion 42 of the adjustment mechanism 22 threadingly engages the screw 124 of the screw-type drive system 122 and will be moved relative to the frame portion 40 of the adjustment mechanism 22 as the armrest 16 is moved between the plurality of positions.

Referring again to FIGS. 5 and 6, the control 24 for the motorized vehicle armrest assembly 10 can include various user interface mechanisms that can include, but are not limited to, switches, buttons, touch screens, dials, levers, or other similar user interface mechanism that is configured to control a motorized aspect of the vehicle 14. In such an embodiment, where a motor 120 is used to operate the vertically operable armrest 16, the control 24 can be located proximate the handle 110 of the armrest 16 or upon a surface of the armrest 16. In various embodiments, the control 24 can be disposed proximate a central console of the vehicle 14 or in a regional console disposed within a second or third row of the vehicle 14 for operating the various vehicle armrest assemblies 10 within specific portions of the passenger cabin 72.

Figure 7:
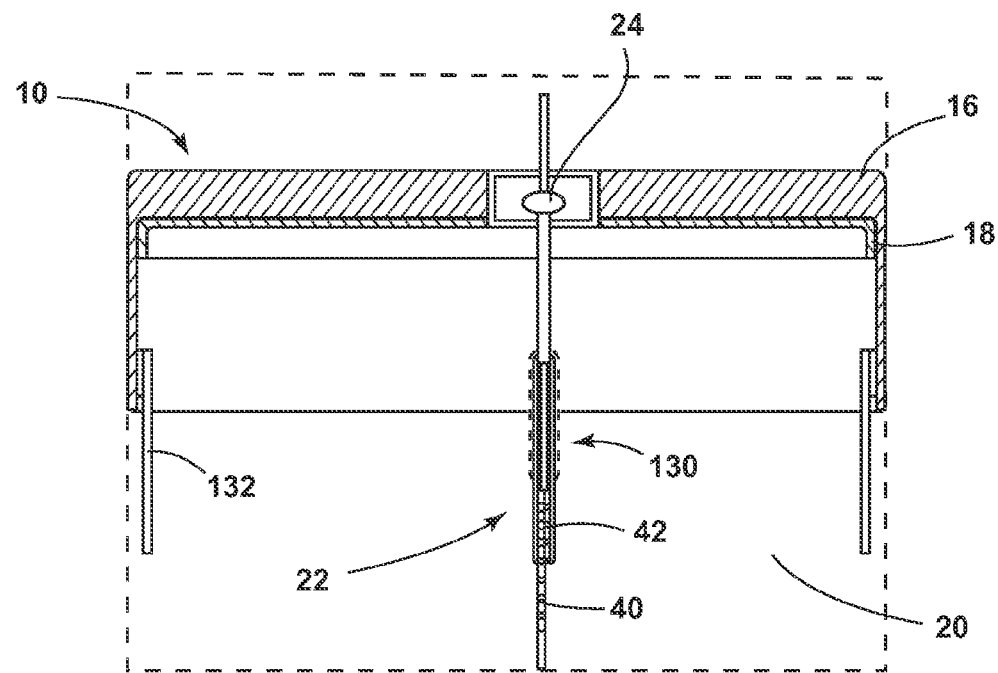
FIG. 7 is a cross-sectional view of the vertically operable armrest of FIG. 2 taken along line VII-VII showing the single track operating system for the vertically operable armrest.

Referring now to FIG. 7, it is contemplated that the adjustment mechanism 22 can include a single-track 130 adjustment mechanism 22. In such an embodiment, a single member of the substrate portion 42 engages a corresponding single member of the frame portion 40 of the adjustment mechanism 22. In such an embodiment, one or more lateral guides 132 may be used in conjunction with the single-track 130 adjustment mechanism 22 to provide lateral stability and to substantially prevent fore and aft twisting during use of the vehicle armrest assembly 10 and during repositioning of the armrest 16 between the plurality of vertical positions. In the various embodiments, a single-track 130 adjustment mechanism 22 can be used where the armrest 16 is relatively shorter in length and in applications where additional structural stability may not be desired.

Figure 8:
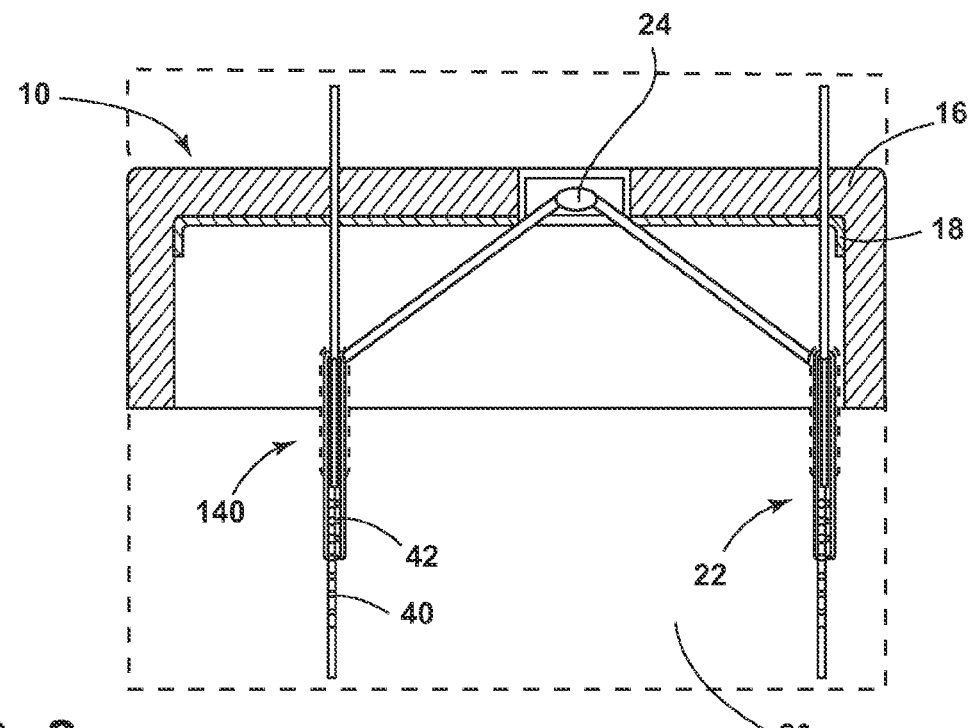
FIG. 8 is a cross-sectional view of an alternate embodiment of the vertically operable armrest incorporating a two-track vertical operating system for the vertically operable armrest.

Referring now to FIG. 8, in various embodiments, the adjustment mechanism 22 can include a multiple track system, such as a dual-track 140 adjustment mechanism 22, wherein the frame portion 40 of the adjustment mechanism 22 includes two tracks, and wherein the substrate portion 42 of the adjustment mechanism 22 includes at least two corresponding securing members that selectively engage the two tracks of the frame portion 40, respectively. In such an embodiment, the two or more tracks and corresponding securing members provide additional structural integrity to the dual-track 140 adjustment mechanism 22 in order to secure the armrest 16 in one of the vertical positions. In such an embodiment, lateral guides 132 may be omitted due to the added strength of the dual-track 140 adjustment mechanism 22. It is contemplated that the dual-track 140 adjustment mechanism 22 may be used in situations where the armrest 16 has a relatively longer length or where greater structural integrity is desired, depending upon the application of the vehicle armrest assembly 10 and the particular vehicle 14 in which the vehicle armrest assembly 10 is disposed. In the various embodiments, the dual-track 140 adjustment mechanism 22 can include a manually operated control 24 or an automatic, motorized control 24 for raising and lowering the armrest 16 between the plurality of vertical positions. For the dual-track 140 adjustment mechanism 22, one motor 120 may be utilized to simultaneously operate both of the tracks. In various alternate embodiments, each of the tracks may include a dedicated motor 120, wherein each of the motors 120 is in communication with the control 24.

In the various embodiments, it is contemplated that the vehicle armrest assembly 10 can be disposed within one of the front doors, one of the rear doors, or adjacent to seating with no adjacent door, such as the rear seating position of a two-door vehicle or the third row of an SUV, CUV, or other similar utility vehicle. Generally, the control 24 for each of the vehicle armrest assemblies 10 can be disposed proximate the armrest 16 intended to be controlled. It is contemplated that the vehicle 14 can include a master control 24 proximate the front driver's seat that can include an override mechanism, such as a child lock, for preventing unwanted use of any one of the vertically operable armrests 16 within the vehicle 14.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle armrest assembly comprising:
    a vertically operable armrest;
    a door frame coupled to the armrest,
    an adjustment mechanism that selectively positions the armrest between a plurality of vertical positions relative to the door frame;
    a control in communication with the adjustment mechanism; and
    an interior door trim configured to slidably engage a recess defined in a cushion of the armrest, wherein a portion of the cushion extends between the door trim and the substrate.

2. The vehicle armrest assembly of claim 1, wherein the adjustment mechanism includes a frame portion and a substrate portion, and wherein the frame portion and substrate portions cooperate to adjustably secure the armrest in any one of the plurality of vertical positions, and wherein the control is in communication with at least one of the substrate portion and the frame portion.

3. The vehicle armrest assembly of claim 2, wherein the frame portion includes a plurality of slots, and wherein the substrate portion includes a corresponding plurality of teeth that are adapted to engage the plurality of slots to selectively position the armrest in any one of the plurality of vertical positions.

4. The vehicle armrest assembly of claim 2, wherein the substrate portion includes a release mechanism to selectively disengage the substrate portion from the frame portion, wherein the control is in communication with the release mechanism.

5. The vehicle armrest assembly of claim 3, wherein the frame portion includes two tracks, and wherein the substrate portion includes at least two corresponding securing members that selectively engage to the two tracks, respectively.

6. The vehicle armrest assembly of claim 2, further comprising:
    a motor in communication with at least one of the substrate portion and the frame portion, wherein the motor vertically moves the substrate portion to position the armrest in any one of the plurality of positions, and wherein the control is in communication with the motor.

7. The vehicle armrest assembly of claim 6, wherein the motor operates a screw-type drive system to position the armrest in any one of the plurality of positions.

8. A vehicle armrest comprising:
    a door frame;
    a door trim; and
    an armrest vertically operable relative to the door frame and door trim between a plurality of positions, wherein the armrest includes a recess within an armrest cushion for receiving a substantial portion of the door trim in each of the plurality of positions, and wherein the recess maintains the door trim distal from a substrate of the armrest.

9. The vehicle armrest of claim 8, further comprising:
    an adjustment mechanism slidably coupling the substrate of the armrest to the door frame, wherein the adjustment mechanism includes a frame portion and a substrate portion, and wherein the frame portion and substrate portions cooperate to adjustably secure the armrest in any one of a plurality of vertical positions; and
    a control in communication with at least one of the substrate portion and the frame portion, wherein the control is disposed proximate the armrest cushion.

10. The vehicle armrest of claim 9, wherein the frame portion includes a plurality of slots, and wherein the substrate portion includes a corresponding plurality of teeth that are adapted to engage the plurality of slots to selectively position the armrest in any one of the plurality of vertical positions.

11. The vehicle armrest of claim 9, wherein the substrate portion includes a release mechanism to selectively disengage the substrate portion from the frame portion, wherein the control is in communication with the release mechanism.

12. The vehicle armrest of claim 10, wherein the frame portion includes two tracks, and wherein the substrate portion includes at least two corresponding securing members that selectively engage to the two tracks, respectively.

13. The vehicle armrest of claim 9, further comprising:
    a motor in communication with at least one of the substrate portion and the frame portion, wherein the motor vertically moves the substrate portion to position the armrest in any one of the plurality of positions, and wherein the control is in communication with the motor.

14. The vehicle armrest of claim 13, wherein the motor operates a screw-type drive system to position the armrest in any one of the plurality of positions.

15. A vertically operable armrest for a vehicle door, the armrest comprising:
    a vertically operable cushion having a substrate and a recess defined within an interior portion of the vertically operable cushion;
    a door frame coupled to the substrate,
    an adjustment mechanism having a substrate portion and a frame portion, wherein the adjustment mechanism selectively positions the substrate between a plurality of vertical positions relative to the door frame;
    a control in communication with at least one of the substrate portion and the frame portion of the adjustment mechanism; and
    an interior door trim configured to slidably engage the recess in each of the plurality of positions of the substrate, and wherein the recess positions the door trim distal from the substrate, wherein the interior door trim is free of attachment with the vertically operable cushion at the recess, and wherein a portion of the recess between the door trim and the vertically operable cushion defines a deflection space within which the door trim is capable of lateral deflection within the recess.

16. The vertically operable armrest of claim 15, wherein the frame portion includes a plurality of slots, and wherein the substrate portion includes a corresponding plurality of teeth that are adapted to engage the plurality of slots to selectively position the armrest in any one of the plurality of vertical positions, and wherein the substrate portion includes a release mechanism to selectively disengage the substrate portion from the frame portion.

17. The vertically operable armrest of claim 15, further comprising:
   a motor in communication with at least one of the substrate portion and the frame portion, wherein the motor vertically moves the substrate portion to position the armrest in any one of the plurality of positions, and wherein the control is in communication with the motor.

18. The vertically operable armrest of claim 15, wherein the vertically operable cushion includes a handle portion, and wherein the control is disposed proximate the handle portion.

\* \* \* \* \*